(12) United States Patent
Kim

(10) Patent No.: US 8,887,196 B2
(45) Date of Patent: Nov. 11, 2014

(54) SYSTEM, MOBILE TERMINAL AND METHOD FOR DISPLAYING OBJECT INFORMATION IN REAL TIME

(75) Inventor: Youn Seok Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 303 days.

(21) Appl. No.: 13/228,986

(22) Filed: Sep. 9, 2011

(65) Prior Publication Data

US 2012/0185896 A1 Jul. 19, 2012

(30) Foreign Application Priority Data

Jan. 18, 2011 (KR) .................. 10-2011-0005052

(51) Int. Cl.
| | |
|---|---|
| *H04N 7/10* | (2006.01) |
| *H04N 7/025* | (2006.01) |
| *H04N 21/436* | (2011.01) |
| *H04N 21/41* | (2011.01) |

(52) U.S. Cl.
CPC ......... *H04N 21/4126* (2013.01); *H04N 21/436* (2013.01)
USPC ............................................. 725/32

(58) Field of Classification Search
CPC .................. H04N 21/41407; H04N 21/25825; H04N 21/4126; H04N 21/4222; H04N 21/42218; H04N 21/8146; H04N 21/4524; H04N 21/435; H04N 21/458; H04N 21/8126; H04N 21/812

USPC .................. 725/32, 37, 62, 116, 135, 60, 29; 726/30; 345/157; 705/303
See application file for complete search history.

(56) References Cited

U.S. PATENT DOCUMENTS

| | | | | |
|---|---|---|---|---|
| 8,381,310 | B2 * | 2/2013 | Gangotri et al. | 726/30 |
| 8,441,441 | B2 * | 5/2013 | Tsai et al. | 345/157 |
| 2005/0235324 | A1 * | 10/2005 | Makipaa et al. | 725/60 |
| 2007/0067808 | A1 * | 3/2007 | DaCosta | 725/62 |
| 2011/0145879 | A1 * | 6/2011 | Rajamani et al. | 725/116 |
| 2012/0038668 | A1 * | 2/2012 | Kim et al. | 345/633 |

FOREIGN PATENT DOCUMENTS

| | | |
|---|---|---|
| JP | 2009-258340 | 11/2009 |
| KR | 10-2005-0016665 | 2/2005 |

* cited by examiner

*Primary Examiner* — Nasser Goodarzi
*Assistant Examiner* — An Nguyen
(74) *Attorney, Agent, or Firm* — H.C. Park & Associates, PLC

(57) ABSTRACT

A system, mobile terminal and a method for displaying object information corresponding to an image object in real time are described in this disclosure. The system includes: a TV to transmit an image frame and supplementary data for the image frame, the supplementary data including the object information; and a mobile terminal to receive the image frame and the supplementary data, and to display the object information in real time based on a position of the object displayed on the TV.

17 Claims, 7 Drawing Sheets

Related Art

Related Art

SYSTEM, MOBILE TERMINAL AND METHOD FOR DISPLAYING OBJECT INFORMATION IN REAL TIME

CROSS-REFERENCE TO RELATED APPLICATION

This application claims priority from and the benefit under 35 U.S.C. §119(a) of Korean Patent Application No. 10-2011-0005052, filed on Jan. 18, 2011, which is incorporated by reference for all purposes as if fully set forth herein.

BACKGROUND

1. Field

This disclosure relates to a system, mobile terminal and a method for displaying object information and, more particularly, a system, mobile terminal and a method for displaying object information corresponding to an image object in real time.

2. Discussion of the Background

In a digital TV and IPTV environment, video and audio data and secondary data (supplementary data) are transmitted through a secondary transport channel. Such supplementary data has been auxiliary data associated with image data, and has been used to provide a link to a web page, advertisement or service data associated with the image data.

FIG. 1 is a flowchart illustrating a method for providing an IP television service using a mobile phone according to the related art.

This technique provides a method for providing an IPTV service using a mobile phone, by allowing the use of personal TV content using the mobile phone at any place where an IPTV and set-top box is located, and allows the mobile phone and the set top box to receive a personal service without inputting a PIN code. Referring to FIG. 1, user information is delivered, with the user information pertaining to a mobile communication user of an IPTV set-top box (STB), and the user information may be delivered over an infrared communication or personal area network (PAN) (S110). After which, the user information is received by the IPTV STB with a Digital Media Center (DMC) Operation Service System (OSS) (S120). Detailed information of a subscriber corresponding to the user information from the OSS of the mobile communication company is acquired (S130). After which, the acquired detailed information of the subscriber and the subscriber information managed by the DMC OSS and a generated customized service and target marketing information is combined (S140). The generated customized service and target marketing information of the IPTV STB to provide a service is transmitted (S150). Thus, a customized service using mobile communication subscriber information allows for a realization of targeted marketing.

However, since the transmitted supplementary data is simultaneously processed on a TV in the above described method, a part or the whole of an image of the TV may be blocked by the supplementary data. In addition, it is inconvenient to search for desired supplementary data. The desired supplementary data may refer to the customized data which is provided to the user in the targeted marketing scheme described above.

FIG. 2 is a block diagram of a system (hereinafter, referred to as a "media commerce system 200") to connect an internet page to each frame of a moving image according to the related art.

Referring to FIG. 2, a specific key may be activated while viewing a moving image (such as a file or streamed data) using an information communication terminal or information communication terminals (a mobile phone, a PDA, a DMB mobile phone, a WiBro terminal, a computer, etc.) 1, 2, 3, . . . , and N, A100, B100 and C100. In this case, the frame and title of the moving image, which is reproduced at a time the key is activated, are transmitted to the media commerce system 200 through a wired/wireless communication network 300. Thereafter, the media commerce system 200 determines if an internet address is stored in correspondence with the frame and title of the moving image, and if so, attempts to connect to an internet page, reads information, and transmits the information to the information communication terminals 1, 2, 3, . . . , and N, A100, B100 and C100. As a result, the moving image may be connected to the internet page while viewing the moving image. If such a method is used, it is possible to retrieve information about products which appear in a TV program, and purchase the product if desired.

However, since the information communication terminals, such as A100, B100 and C100 play an image frame back, an increased burden is imposed on a processor and a processing speed may be delayed. In addition, since desired information is acquired by requesting information to the media commerce system 300 and receiving the information, the information is not viewed in real time.

SUMMARY

This disclosure is directed to enabling multiple users who are viewing a TV to view personalized object information corresponding to a portion of the TV image via a personal mobile terminal.

Additional features of the invention will be set forth in the description which follows, and in part will be apparent from the description, or may be learned by practice of the invention.

An exemplary embodiment provides a system to view an object with object information, the system including: a TV to transmit an image frame and supplementary data for the image frame, the supplementary data including the object information; and a mobile terminal to receive the image frame and the supplementary data, and to display the object information in real time based on a position of the object displayed on the TV.

An exemplary embodiment provides a method for displaying object information in a mobile terminal, the method including, storing an initial position of the mobile terminal and supplementary data received from a TV; retrieving object information from the stored supplementary data, the object information being based on an object displayed on the TV and the mobile terminal; and displaying the retrieved object information based on the object.

An exemplary embodiment provides a mobile terminal to display an object along with object information, including: a receiver to receive an image frame and supplementary data in real time, and to display the object information in real time based on a position of the object displayed from a source; a storage unit to store an initial position of the mobile terminal and the received supplementary data; a position tracking unit to track a current position of the mobile terminal; and a controller to retrieve the object information corresponding to the object from the stored supplementary data.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
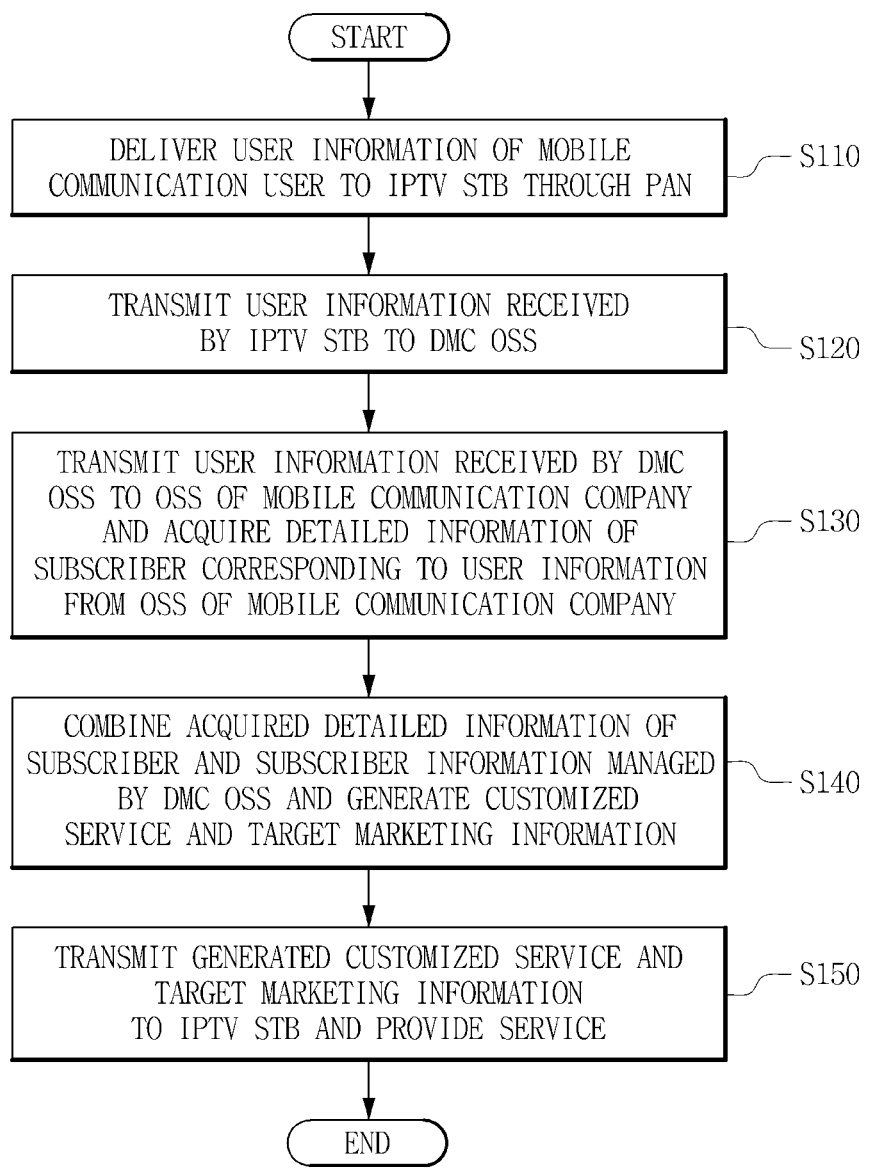
FIG. 1 is a flowchart illustrating a method for providing an IP television service using a mobile phone according to the related art.
Figure 2:
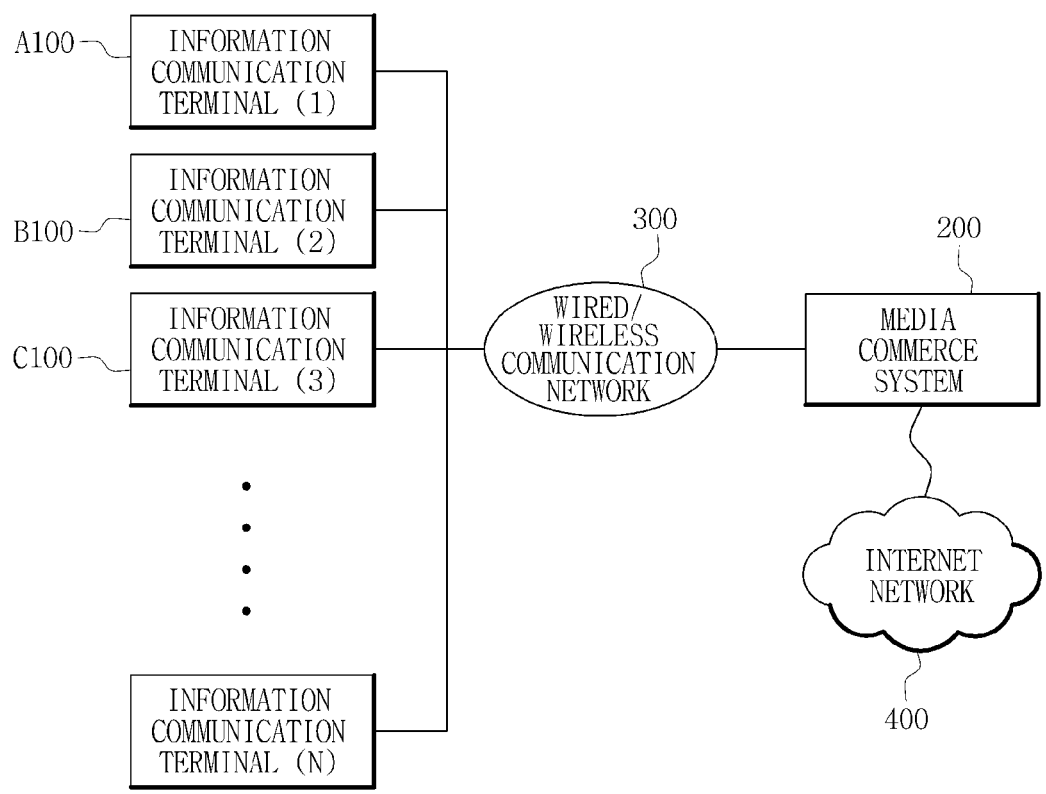
FIG. 2 is a block diagram of a system (hereinafter, referred to as a "media commerce system 200") to connect an internet page to each frame of a moving image according to the related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE
ILLUSTRATED EMBODIMENTS

Exemplary embodiments will now be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 3:
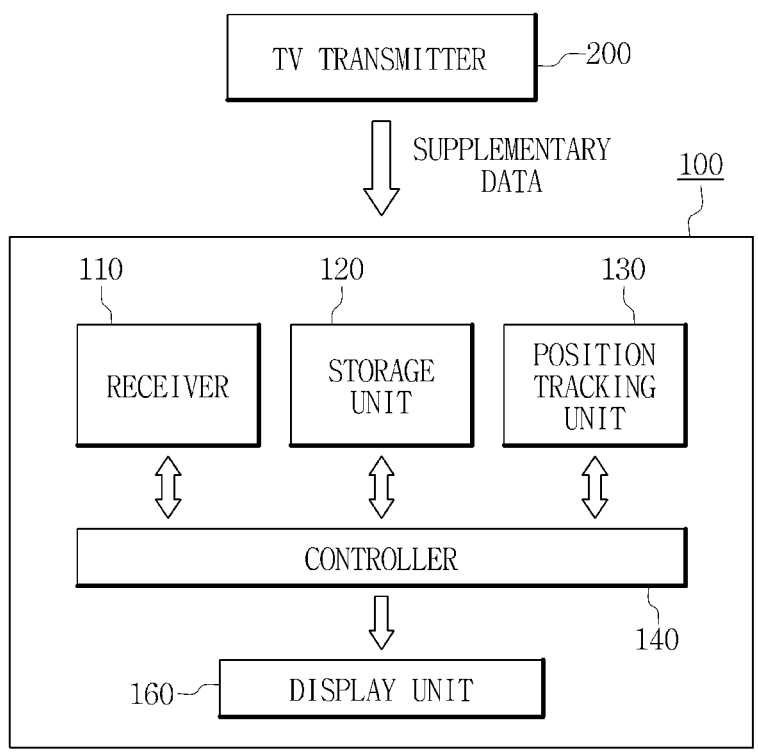
FIG. 3 is a block diagram of a system to display object information according to an exemplary embodiment.

FIG. 3 is a block diagram of a system to display object information according to an exemplary embodiment.

Referring to FIG. 3, the system includes a TV transmitter 200, and a mobile terminal 100 to receive and process the supplementary data from the TV transmitter 200. The mobile terminal 100 includes a receiver 110, a storage unit 120, a position tracking unit 130, a controller 140 and a display unit 160. More specifically, an image reception station (IPTV) (not shown) includes a demultiplexer (DEMUX). The DEMUX extracts supplementary data including a marker, QR data and a profile (hereinafter, referred to as "object information") of a specific object synchronized with a specific image if an image is received. The DEMUX calculates position information of the specific object along with the object information at a time interval, and stores the object information and the position information. Since the position information indicates the position of the object, the position information also indicates the position of the object information of the object. The object information and the position information are transmitted to the mobile terminal 100 via the TV transmitter 200 using a wireless protocol or a wired connection. The receiver 110 of the mobile terminal 100 receives supplementary data of a frame from the TV transmitter 200. The frame may be a first frame transmitted from the TV transmitter 200; however, the frame is not limited to being the first frame. The received supplementary data includes object information of all, or some, of the objects currently displayed on a display of a TV. The wireless protocol may be Bluetooth® or Wi-Fi-direct®.

In order to display a TV output on the display unit 160, a menu option is activated through a selection on an application of the mobile terminal 100 (such as a camera application) or displayed by executing a camera preview application.

Figure 6:
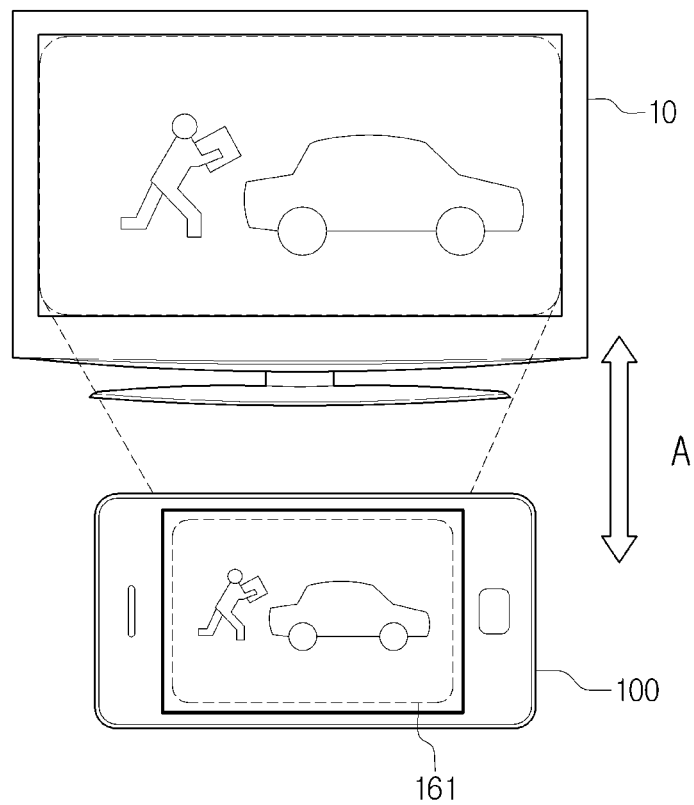
FIG. 6 is a diagram illustrating synchronization of a mobile terminal and a TV according to an exemplary embodiment.

FIG. 6 is a diagram illustrating synchronization of a mobile terminal and a TV according to an exemplary embodiment.

Referring to FIG. 6, if viewing the TV output via the display unit 160, synchronization is performed so that the output of the TV 10 is represented on the display unit 160. Synchronization may be implemented by matching the output of the TV 10 with a rectangular virtual TV shape 161 in the display unit 160. Synchronization is used to determine which portion of the TV 10 is being display by the display unit 160.

Referring back to FIG. 3, the storage unit 120 stores the supplementary data received by the receiver 110 and an initial position of the mobile terminal 100. The storage may occur upon synchronization. The position tracking unit 130 tracks the position of the mobile terminal 100 by detecting motion of the mobile terminal 100. The position tracking unit 130 may use a position sensing device, such as a gyroscope sensor, acceleration sensor or the like. A gyroscope sensing technique may be used to track the position of the mobile terminal 100. If the gyroscope sensor and the acceleration sensor are simultaneously used, it becomes possible to more accurately detect the motion of the mobile terminal 100 in all directions, versus only 3 axes, using only the acceleration sensor. Accordingly, the position of the mobile terminal 100 moved after synchronization in real time is detected. A distance between the mobile terminal 100 and the TV 10, the height of the mobile terminal 100 changed after synchronization, and horizontal change of the mobile terminal 100 after synchronization, a rotation angle of the mobile terminal 100, and change in slope of the mobile terminal 100 may also be detected.

The controller 140 may be connected to the receiver 110, the storage unit 120 and the position tracking unit 130. The controller 140 retrieves object information included in a range displayed on the display unit 160, which captures a display of the TV 10 and displays the retrieved object information at the position of the object displayed on the display unit 160. The range displayed may correspond to the portions of the TV 10 that is captured by the mobile terminal 100; however, aspects are not limited hereto.

Figure 4:
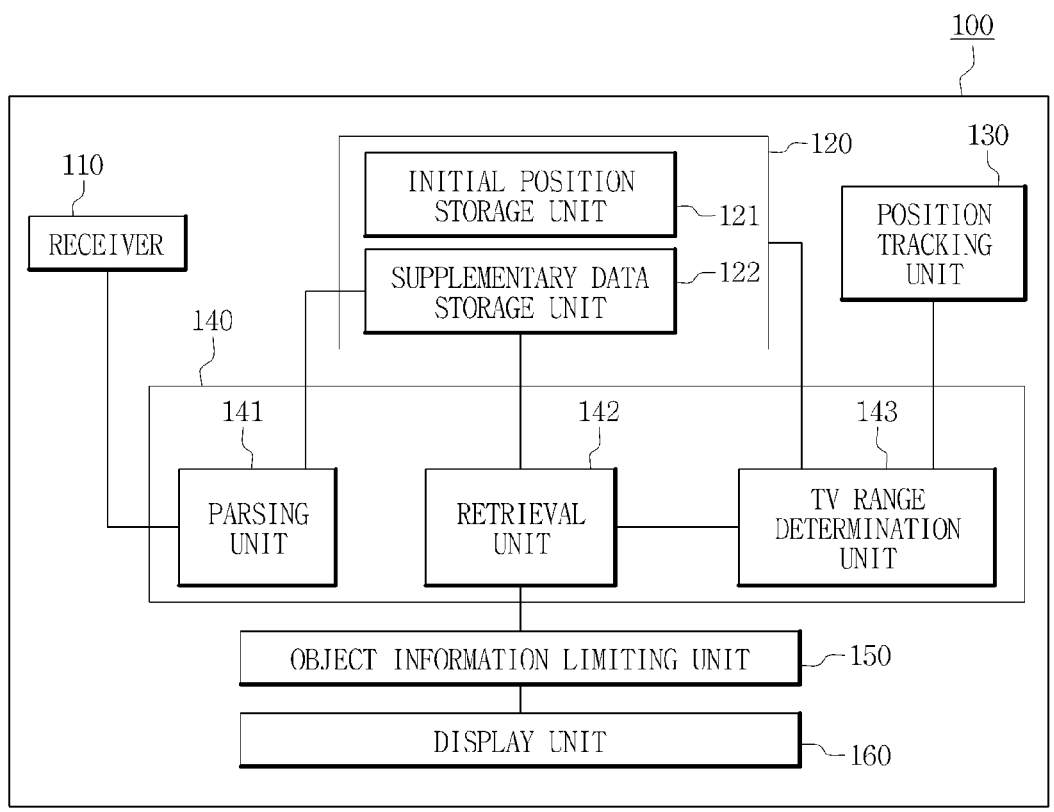
FIG. 4 is a block diagram of a system to display object information according to an exemplary embodiment.

FIG. 4 is a block diagram of a system to display object information according to an exemplary embodiment.

Referring to FIG. 4, the storage unit 120 includes an initial position storage unit 121 to store the initial position of the mobile terminal 100 upon synchronization and a supplementary data storage unit 122 to store supplementary data received from the TV transmitter 200. The supplementary data stored in the supplementary data storage unit 122 is parsed by a parsing unit 141 of the controller 140. The supplementary data includes object information and position information. Since the receiver 110 receives supplementary data in real time, the object information and the position information stored in the supplementary data storage unit 122 are also updated in real time. Accordingly, if a new object appears on the TV 10, and is displayed on the display unit 160, due to the object information and the position information of the new object being updated in the supplementary data storage unit 122 in real time, the object information may be displayed on the display unit 160 when the object information is retrieved.

A TV range determination unit 143 included in the controller 140 is connected to the position tracking unit 130 and the initial position storage unit 121, and compares the current position of the mobile terminal 100 tracked by the position tracking unit 130 with the initial position of the mobile terminal 100 stored in the initial position storage unit 121 to determine a TV range currently displayed on the display unit 160. More specifically, as the distance between the display unit 160 (such as an LCD portion of the display unit 160) displayed through the camera lens of the mobile terminal 100 and the subject (TV 10) is decreased, a smaller area of the TV is displayed on the display unit 160 in an enlarged form (similarly to an image obtained by cropping and enlarging an image). If the mobile terminal 100 detects or stores information of a view angle of the camera lens (a visual field of a scene captured by the camera), it is possible to estimate the area of the TV displayed on the display unit 160 according to the distance from the TV 10 upon synchronization. As the mobile terminal 100 moves upward, downward, left or right, the object moves in an opposite direction on a view finder. The position of the mobile terminal is compared with the initial position of the mobile terminal 100 upon synchronization so as to determine which portion of the TV is currently displayed on the display unit 160.

A retrieval unit 142 is connected to the TV range determination unit 143 and the supplementary data storage unit 122, and retrieves object information of the object included in the determined TV range from the supplementary data storage unit 122. The supplementary data storage unit 122 stores the object information and the position information of the object information. If the TV range displayed on the display unit 160 is determined, the range is analyzed based on a coordinate range so as to identify the position information using the coordinate information. As a result, the retrieval unit 142 retrieves the object information corresponding to the position information from the supplementary data storage unit 122. The retrieved object information may be directly displayed on the display unit 160 or may be partially filtered by an object information limiting unit 150 connected to the retrieval unit 142. More specifically, it is possible to control the level of the object information displayed on the display unit 160 according to a filtering level or profile designated by the mobile terminal 100. The level may correspond to an amount of data associated with the object information shown along with the object or to whether object information is shown for certain types of objects. For example, only person information or product information may be displayed as object information, or the display of object information that is adult information may be blocked or filtered. If filtered object information is displayed, a warning message may be displayed along with the filtered object information.

In the retrieved object information or the filtered object information, for example, if an object displayed on the TV is a person, information about the person, such as a profile or a Facebook, is displayed, and the display may include a QR code in a speech bubble shape. If an object displayed on the TV is a product, information such as a product name, store information or lowest price is displayed to overlap with the object, and the display may include a QR code. Information about a building or a place may be displayed as secondary information using augmented reality, an expression method using augment reality or a similar method.

Figure 7:
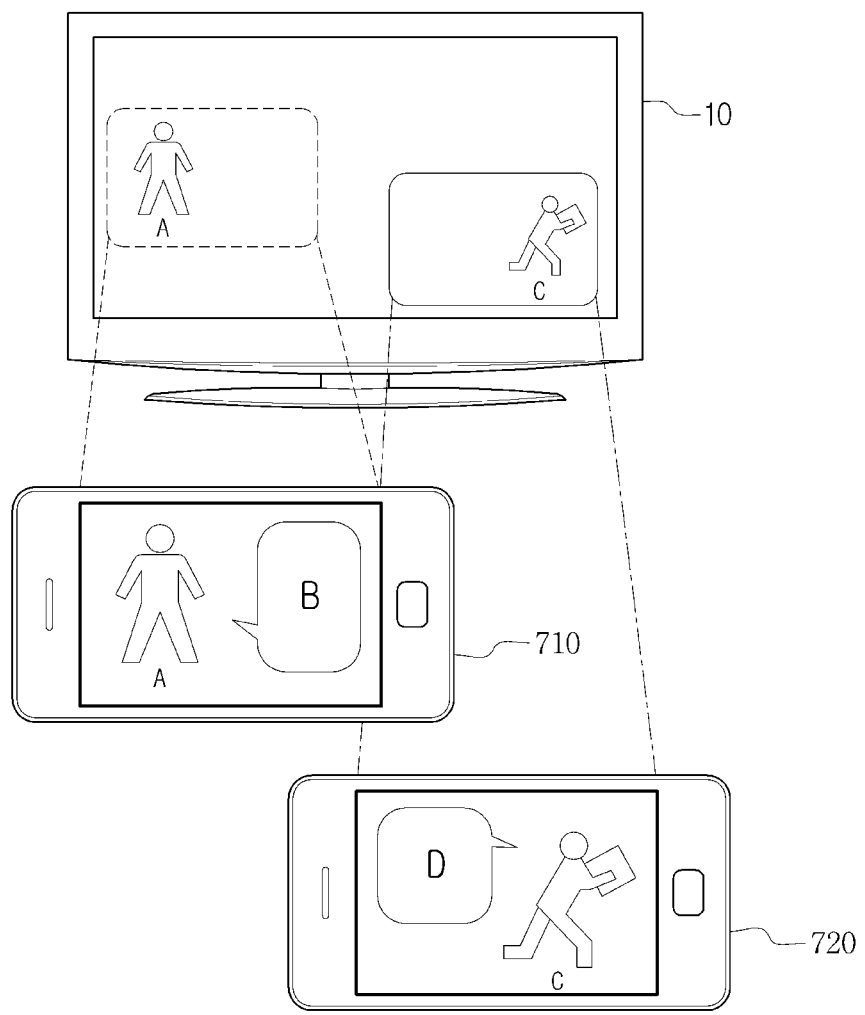
FIG. 7 is a diagram illustrating displaying object information according to an exemplary embodiment.

FIG. 7 is a diagram illustrating displaying object information according to an exemplary embodiment.

Referring to FIG. 7, if a person positioned at a position A is displayed on a mobile terminal 710, a speech bubble B, which is object information for the position information corresponding to the position A is displayed. If a person positioned at a position C is displayed on a mobile terminal 720, a speech bubble D which is object information for the position information corresponding to the position C is displayed. The mobile terminal 710 and the mobile terminal 720 each display a portion or a range of the TV 10.

Figure 5:
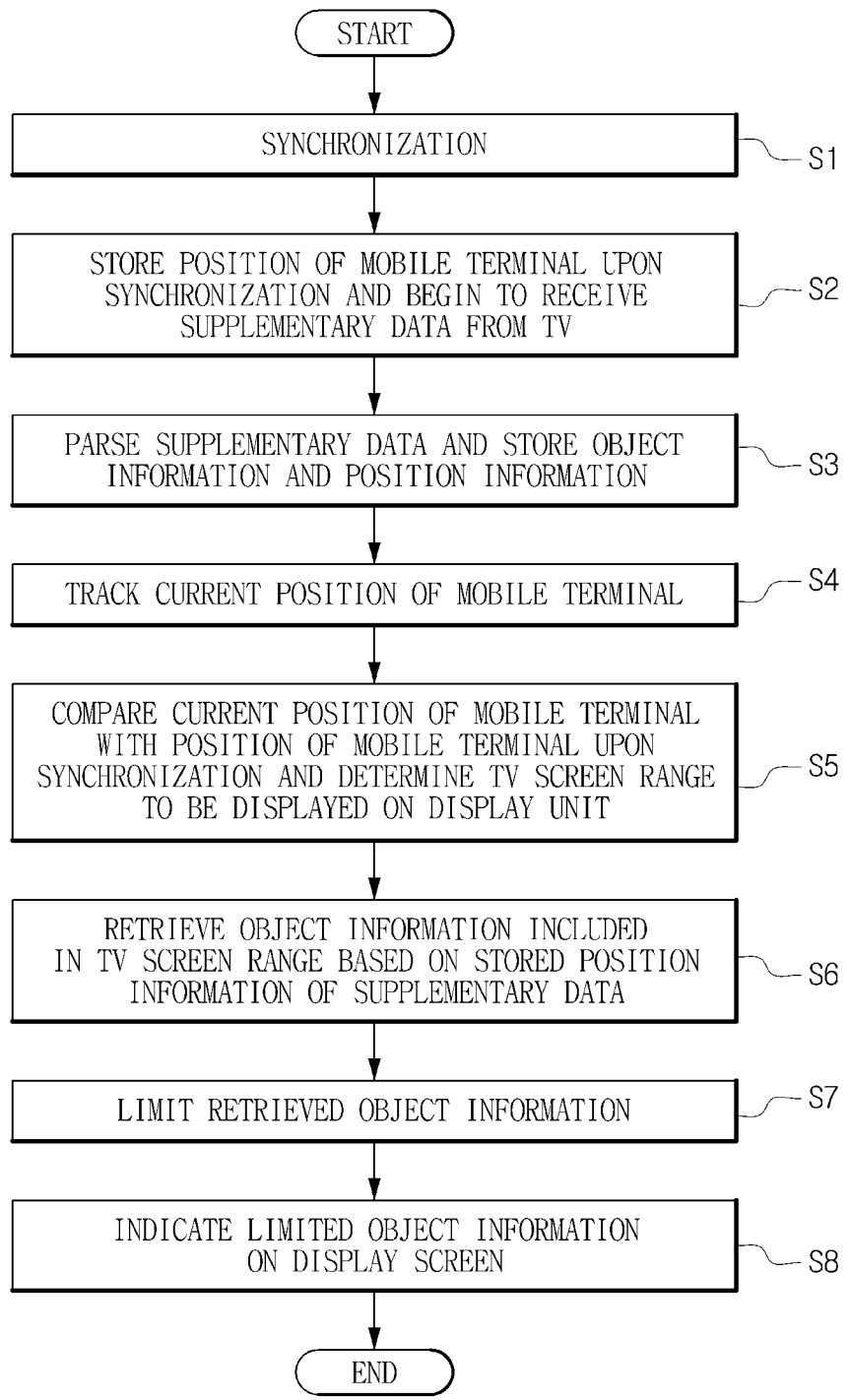
FIG. 5 is a flowchart illustrating a method for displaying object information according to an exemplary embodiment.

FIG. 5 is a flowchart illustrating a method for displaying object information according to an exemplary embodiment.

Referring to FIG. 5, the display of the mobile terminal 100 and the display of the TV 10 are synchronized (S1). As described above, if the mobile terminal 100 moves, a TV range displayed on the display unit 160 is determined. The initial position of the mobile terminal 100 upon synchronization may be used for the determination. The initial position of the synchronized mobile terminal 100 is stored in the initial position storage unit 121 and the receiver 110 of the mobile terminal 100 begins to receive supplementary data from the TV transmitter 200 (S2). Thereafter, the parsing unit 141 parses the received supplementary data and stores object information and position information in the supplementary data storage unit 122 (S3). The position tracking unit 130 tracks the current position of the mobile terminal 100 (S4). The tracking of the position is described with reference to FIG. 4. Thereafter, the TV determination unit 143 compares the current position of the mobile terminal 100 with the initial position of the mobile terminal 100 to determine the TV range currently displayed on the display unit 160 (S5). The retrieval unit 142 retrieves the object information included based on the determined TV range based and the position information stored in the supplementary data storage unit 122 (S6). The retrieved object information may be directly displayed on the display unit 160 (S8) or may be partially filtered by the object information limiting unit 150 (S7) and displayed on the display unit 160 (S8).

Accordingly, those viewing a TV may acquire data using their personal terminals, such as mobile terminals. Thus, it becomes possible to divide and manage the object information according to categories regardless of the TV and acquire the supplementary information by displaying supplementary information on the personal terminals. Further, advertisements may be delivered to the personal terminals more effectively. In addition, it is possible for a personal terminal to update based on new information in real time.

According to this disclosure, it becomes possible to view information about an object displayed on a TV through a display of a mobile terminal in real time as augmented reality, and enable multiple people viewing the same TV to personalize information about an object displayed on the TV, and use the information with their mobile terminals.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to view an object and corresponding object information, the system comprising:
    an external device to transmit an image frame comprising a first object at a first position and a second object at a second position, and supplementary data for the image frame, the supplementary data comprising first object information corresponding to the first object and second object information corresponding to the second object; and
    a mobile terminal to receive the image frame and the supplementary data from the external device and to display the first object information but not the second object information in real time when the mobile terminal is located at a position corresponding to the first position of the first object displayed on the external device,
    wherein the display of the first object information is synchronized with the display of the first object on the mobile terminal.

2. The system according to claim 1, wherein the mobile terminal comprises:
    a receiver to receive the supplementary data from the external device in real time;
    a storage unit to store an initial position of the mobile terminal and the received supplementary data;
    a position tracking unit to track a position of the mobile terminal; and
    a controller to retrieve the first object information corresponding to the first object from the stored supplementary data.

3. The system according to claim 2, wherein the storage unit comprises:
    an initial position storage unit to store the initial position of the mobile terminal; and
    a supplementary data storage unit to store the first object information, the second object information, and position information of the first object and the second object.

4. The system according to claim 3, wherein the controller comprises:
    a parsing unit to parse the received supplementary data, acquire the first object information, the second object information, and the position information of the first object and the second object, and transmit the acquired information to the supplementary data storage unit;
    an external device range determination unit to compare the position of the mobile terminal with the stored initial position of the mobile terminal and to determine an external device range based on the comparison; and
    a retrieval unit to retrieve the first object information included in the determined external device range.

5. The system according to claim 4, wherein the mobile terminal further comprises:
    an object information limiting unit to filter the first object information or the second object information; and
    a display unit to display the first object information, the second object information, or the filtered object information.

6. The system according to claim 5, wherein the filtered object information is displayed along with a warning message.

7. The system of claim 1, wherein the first object information further comprises a marker, a position, a Quick Response (QR) code data or a combination thereof associated with the first object.

8. A method for displaying object information in a mobile terminal along with corresponding object information, the method comprising:
    receiving, from an external device, an image frame comprising a first object at a first position and a second object at a second position, and supplementary data for the image frame, the supplementary data comprising first object information corresponding to the first object and second object information corresponding to the second object;
    storing the supplementary data received from the external device;
    retrieving first object information but not the second object information from the stored supplementary data when the mobile terminal is located at a position corresponding to the first position of the first object displayed on the external device; and
    displaying the retrieved first object information,
    wherein the displaying of the first object information is synchronized with the displayed first object.

9. The method according to claim 8, further comprising:
    synchronizing the mobile terminal with the external device;
    parsing the received supplementary data to acquire the first object information, second object information, and position information of the first object and the second object; and
    storing the first object information, the second object information, and the position information of the first object and the second object.

10. The method according to claim 9, further comprising:
    storing an initial position of the mobile terminal;
    tracking a position of the mobile terminal;
    comparing the tracked position with the stored initial position of the mobile terminal to determine an external device range currently displayed on the display unit; and
    retrieving the first object information included in the determined external device range based on the stored position information of the first object.

11. The method according to claim 8, further comprising:
    filtering the first object information or the second object information; and displaying the first object information, the second object information or the filtered object information.

12. The method according to claim 11, further comprising displaying a warning message along with the displayed filtered object information.

13. A mobile terminal to display an object along with corresponding object information, comprising:
- a receiver to receive, from an external device, an image frame comprising a first object at a first position and a second object at a second position, and supplementary data in real time, the supplementary data comprising first object information corresponding to the first object and second object information corresponding to the second object;
- a storage unit to store the received supplementary data;
- a position tracking unit to track a position of the mobile terminal with respect to the external device; and
- a controller to retrieve the first object information but not the second object information from the stored supplementary data when the mobile terminal is located at a position corresponding to the first position of the first object displayed on the external device, and to display the retrieved first object information,
wherein the display of the first object information is synchronized with the display of the first object.

14. The mobile terminal according to claim 13, wherein the storage unit comprises:
- an initial position storage unit to store an initial position of the mobile terminal; and
- a supplementary data storage unit to store the first object information, the second object information, and position information of the first object and the second object.

15. The mobile terminal according to claim 14, wherein the controller comprises:
- a parsing unit to parse the received supplementary data, acquire the first object information, the second object information, and the position information of the first object and the second object, and transmit the acquired object information to the supplementary data storage unit;
- a source range determination unit to compare the position of the mobile terminal with the stored initial position of the mobile terminal and to determine a range based on the comparison; and
- a retrieval unit to retrieve the first object information included in the determined range.

16. The mobile terminal according to claim 15, wherein the mobile terminal further comprises:
- an object information limiting unit to filter the first object information or the second object information; and
- a display unit to display the first object information, the second object information, or the filtered object information.

17. The mobile terminal according to claim 16, wherein the filtered object information is displayed along with a warning message.

* * * * *